June 24, 1930.  C. R. PEIRSON  1,766,529
WINDSHIELD CLEANER
Filed Oct. 26, 1928
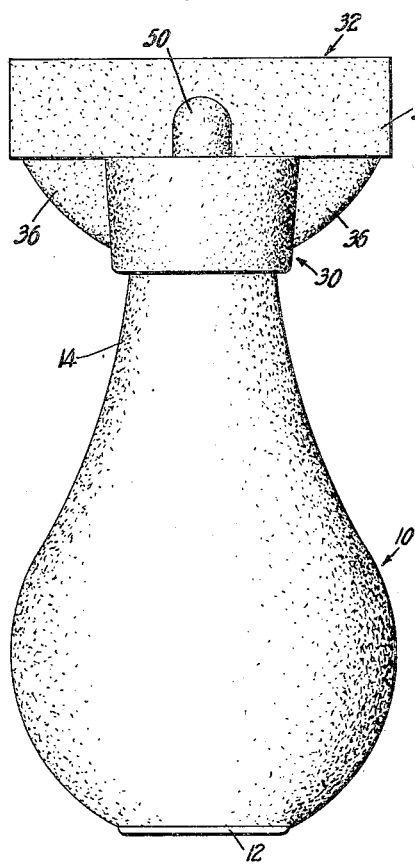
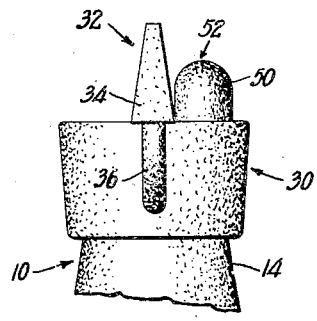
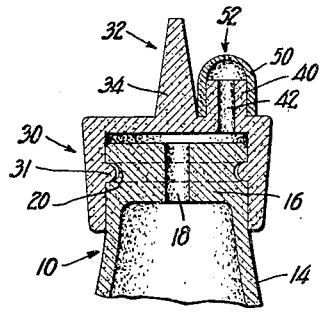
INVENTOR
*Cecil R. Peirson.*
BY
ATTORNEYS Patented June 24, 1930

1,766,529

UNITED STATES PATENT OFFICE

CECIL R. PEIRSON, OF BLOOMFIELD, NEW JERSEY

WINDSHIELD CLEANER

Application filed October 26, 1928. Serial No. 315,216.

This invention relates to cleaning devices and more particularly to windshield cleaners.

It is an object of this invention to provide a windshield cleaning device which may be easily and simply applied as the need arises but which may be kept in a convenient storage receptacle removed from the windshield and from positions interfering with the vision or convenience of the automobile's occupants.

It is a further purpose of the present invention to provide means for cleaning the windshield and for applying thereto cleaning or vision aiding fluids.

A further object of the invention is to provide a non-breakable means for the purposes set forth and one not subject to deterioration by the cleaning fluids employed.

The invention besides supplying improved means for retaining and dispensing cleaning fluids also provides simplified valve means which is normally closed, and therefore prevents escape of fluid therefrom when the device is not in use, but which is openable by pressure on the bulb in the cleaning operation.

The following description and drawings disclose a preferred embodiment of my invention, the means of accomplishing the above, and certain other desirable objects, while the appended claims will more particularly point out my invention.

Figure 1 is a front elevation of a preferred embodiment of my invention;

Figure 2 is a side elevation of the upper portion of the device shown in Figure 1; the lower portion thereof presenting substantially the same outline when viewed in elevation from any direction; and Figure 3 is a cross-sectional elevation of the part shown in Figure 2.

The device shown consists of a reservoir or feeding bulb 10 of compressible material (preferably rubber) having a flattened base 12 and a contracted neck 14 whose upper end is thickened and further contracted at 16 to provide only a small passage 18 extending through the reservoir top. Surrounding portion 16 is a circumferential groove 20 which serves to provide engagement for the head cap portion 30 having an internal rib 31 engaging groove 20 when the head is forced over the reservoir neck (see Figure 3) thus securely retaining the head on the reservoir.

The head 30 is provided with a transverse extension and upward projection in the form of rubber wiper or squeegee 32 preferably thickened at its lower edge 34 to provide greater strength, and reinforced at its overhanging ends by bracket sections 36; —the whole being one integral structure and a part of the same body. Head 30 is further provided with a tubular projection 40 having a duct 42 extending through it and through the cap top.

It will be noted that tube 40 is adjacent, but not in direct contact with, squeegee 32, and it will be understood that when a valve nipple 50 of soft, thin rubber is slipped over tube 40, this valve, and the outlet from reservoir 10, is below and in front of the wiper flange and more or less protected from accidental contact.

Nipple 50 is made, as above set forth, of soft, thin rubber and provided with a small opening 52 forming an outlet port when the reservoir bulb is pressed, but at other times effectively sealing tube 40 and therethrough the reservoir 10. For the sake of clearness, the opening 52 is shown in more or less open position, although normally this opening will be virtual rather than actual, except when the cap is under deformation. Furthermore, when the whole device is stored in a convenient place, such as the automobile tool box or side pocket, leakage will not occur and the cleaner will be available for instant use whenever desired.

When it is desired to fill the device, the outer nipple will be removed, the bulb compressed, and the cleaning fluid sucked in through the duct 42 in the ordinary way. Furthermore, when the nipple is removed, the stream of water from this duct is well adapted for removing soap, for example, from the hands.

It will be evident that the device disclosed herein is particularly adapted to the cleansing of glass surfaces such as automobile windshields and that it may be used to purge the same of dirt and moisture and will apply thereto cleaning and cloud removing or preventing fluids with ease and facility as the need may arise, the wiper supplementing and aiding the action of the fluids dispensed thus providing in a single structure a substitute for the rags, bottles of liquid and applicators therefor formerly needed. It will also be clear that many modifications in the embodiment of my invention, may be made well within the scope of my invention and the spirit of appended claims.

What I claim is:

1. In a windshield cleaner, a compressible rubber cleaning fluid reservoir, a head for said reservoir comprising a rubber cap having integral therewith a wiper and a discharge tube and a nipple valve member fitting over said tube and sealing the same against fluid loss when said cleaner is not in use.

2. In a windshield cleaner, a compressible rubber cleaning fluid reservoir bulb having a contracted neck portion provided with an external circumferential groove and a central fluid duct bore, and a head for said reservoir comprising a cap for said contracted neck portion of the reservoir bulb, said cap being provided with an internally extending rib adapted to engage the groove in said reservoir bulb, with a discharge duct terminating in a short tube at one side of the cap's top adapted to mount a nipple discharge valve and with a soft rubber wiper extending laterally at the sides of the cap body integral therewith and projecting beyond but removed from contact with said discharge duct tube and with the nipple valve thereon so that discharge therefrom can occur only when the device is purposely pressed, whereby said wiper may be used to clean a surface and fluid dispensed thereon as desired.

3. In a windshield cleaner, a compressible rubber bulb constituting a cleaning-fluid reservoir and shaped to be grasped by the hand when in use, a head for said reservoir comprising a rubber cap having integral therewith a squeegee extending transversely of the bulb, a normally closed discharge tube located adjacent and below the squeegee, the walls of said tube adjacent the opening being deformable under pressure to permit escape of fluid upon squeezing the bulb.

In testimony whereof I have affixed my signature to this specification.

CECIL R. PEIRSON.